United States Patent [19]

Jung

[11] Patent Number: 4,576,622
[45] Date of Patent: Mar. 18, 1986

[54] MANUFACTURE OF PREFORMS FOR ENERGY TRANSMITTING FIBERS
[76] Inventor: Lothar Jung, 1355 Plymouth Rd., Bridgewater, N.J. 08807
[21] Appl. No.: 555,484
[22] Filed: Nov. 28, 1983
[51] Int. Cl.$^4$ ............................................. C03B 37/02
[52] U.S. Cl. ........................................ 65/13; 65/3.2; 65/115; 65/116
[58] Field of Search ................... 65/13, 18.2, 115, 116, 65/120, 146, 60.1, 60.8, 157, 3.2; 118/724, 720; 82/DIG. 1

[56] References Cited

U.S. PATENT DOCUMENTS

| | | | |
|---|---|---|---|
| 1,128,059 | 2/1915 | Schoop | 264/125 |
| 2,272,342 | 2/1982 | Hyde | 65/21.5 |
| 2,288,068 | 6/1942 | Brebeck | 82/DIG. 1 |
| 3,818,982 | 6/1974 | Wager | 118/724 |
| 3,826,560 | 7/1974 | Schultz | 350/96.31 |
| 3,907,536 | 9/1975 | Achener | 65/60.8 |
| 3,917,459 | 11/1975 | Falckenberg et al. | 65/120 |
| 4,217,027 | 8/1980 | MacChesney et al. | 350/96.3 |
| 4,331,462 | 5/1982 | Fleming et al. | 65/3.12 |
| 4,368,846 | 1/1983 | Rau et al. | 65/18.2 |
| 4,412,853 | 11/1983 | Partus | 65/3.12 |

FOREIGN PATENT DOCUMENTS 983033  2/1965  United Kingdom ........... 82/DIG. 1

OTHER PUBLICATIONS

Peter C. Schultz, "Fabrication of Optical Waveguides by the Outside Vapor Deposition Process," *Proceedings of the IEEE*, vol. 68, No. 10, Oct. 1980, pp. 1187-1190.
T. Izawa & N. Inagaki, "Materials and Processes for Preform Modified Chemical Vapor Deposition and Plasma Chemical Vapor Deposition," *Proceedings of the IEEE*, vol. 68, No. 10, Oct. 1980, pp. 1181-1183.
MacChesney "Materials and Processes for Preform Fabrication-Modified Chemical Vapor Deposition and Plasma Chemical Vapor Deposition," *Proceedings of the IEEE*, vol. 68, No. 10, Oct. 1980, pp. 1181-1184.
Personick, Stewart D., *Optical Fiber Transmission Systems* pp. 3-6.
Schultz, P. C., "Vapor Deposition Process Capabilities for Optical Waveguide Fabrication," *Advances in Ceramics* (1979) pp. 3-7.
Simpson, V. R. et al., "MCVD Preform Fabrication at High Deposition Rates," *Advances in Ceramics* (1978) pp. 8-13.
Andrejco, M. J. & Miller, T. J. "Large Preforms Produced at High Rates by Particulate-Deposition Methods," *Technical Digest of Optical Fiber Communication* (Wash. D.C. 1979), p. 48.
Pearson, A. D. et al. "Fabrication of Synthetic High Silica Tubing and Optical Fibers," *Technical Digest of Optical Fiber Communication* (Wash. D.C. 1979), p. 48.
Walker, K. L. et al., "Thermophoretic Deposition of Small Particles in the Modified Chemical Vapor Deposition (MCVD) Process," *Journal of the American Ceramic Society*, vol. 63, No. 9-10 (Oct. 1980) pp. 552-558.

*Primary Examiner*—S. Leon Bashore
*Assistant Examiner*—Michael K. Boyer
*Attorney, Agent, or Firm*—Pahl, Lorusso & Loud

[57] ABSTRACT

The invention relates to a glass lathe for producing preforms which may be drawn into energy transmitting fibers. The apparatus includes a head stock and a tail stock for rotatably holding a starter tube and the preform as it is built from the starter tube. The tail stock is movable along the lathe bed with respect to the head stock so that a preform may be drawn down to approximately the diameter of the starter tube. A carriage is provided on the lathe bed which carries at least one burner for melting a particulate quartz feed and depositing it onto the rotating surface of the starter tube. A slide member mounted on the carriage supports a container for catching particulate quartz which does not adhere to the tube and a coolant reservoir adapted to produce a fountain for contacting and cooling the tube downstream of the burner. Layers of silica and doped silica are first deposited on the tube interior by introducing reactant vapors into the tube interior while traversing the length of the starter tube with the burner. Subsequent to the internal deposition step, the OD of the tube is built up by deposition of successive layers of fused quartz by feeding particulate quartz through the burner flame onto the rotating outer tube surface. After building the tubular preform to suitable diameter, it is drawn down to approximately the OD of the starter tube and cut into suitable lengths for use as preforms.

6 Claims, 10 Drawing Figures

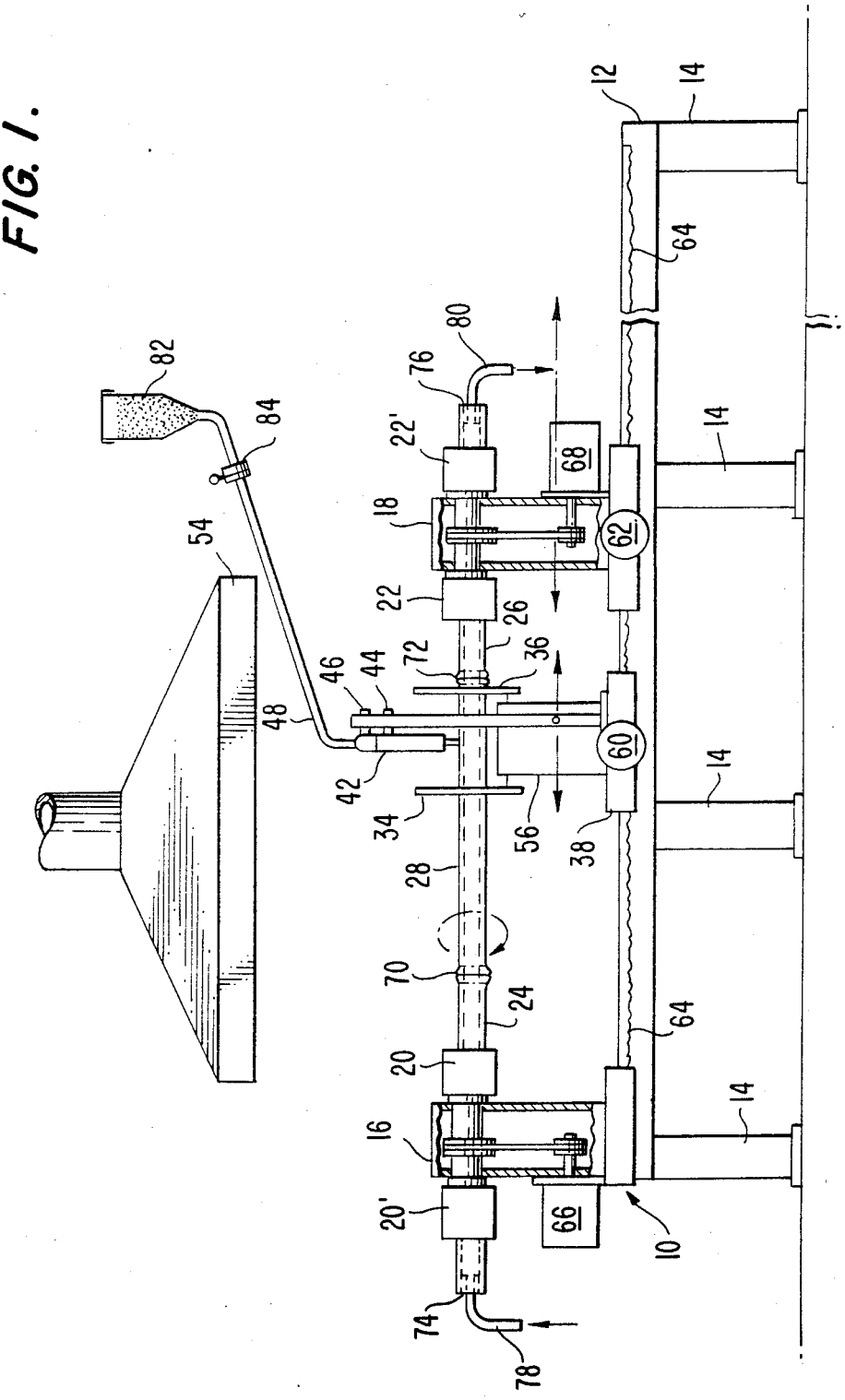

MANUFACTURE OF PREFORMS FOR ENERGY TRANSMITTING FIBERS

BACKGROUND OF THE INVENTION

The present invention relates to the manufacture of light guide fibers for light wave communications systems, and more specifically to a method and apparatus for the manufacture of preforms to be drawn into the fiber.

The entire telephone communications system in this country is undergoing a major renovation in which copper wire is being replaced by light guide fibers. The advantages of light guide fibers over copper wire are numerous - higher capacity (information can be transmitted at a much higher speed), capability of handling higher frequencies, smaller size and facility for signal amplification by repeaters utilizing lasers. If one considers the millions of miles of copper wire to be replaced by light guide fibers, one quickly realizes the enormity of the need for economical processes and apparatus for producing the fiber.

PRIOR ART

The light guide fibers finding use in the telecommunications field consists of a core and cladding of different refractive indices. The current state-of-the-art manufacturing processes utilize three basic methods for producing the clad fibers: (1) outside vapor deposition (OVD) or outside vapor-phase oxidation (OVPO); (2) vapor-phase axial deposition (VAD); and (3) modified chemical vapor deposition (MCVD).

Peter C. Schultz describes the OVD process in his article entitled "Fabrication of Optical Waveguides by the Outside Vapor Deposition Process" published in *Proceedings of the IEEE,* Vol. 68, No. 10, October 1980, pp. 1187-1190. In the OVD process high purity constituents ($SiCl_4$, $GeCl_4$, etc.) are reacted in combustion flames to form particles which are collected on the outer diameter of a mandrel. The mandrel is then removed and the adherent particles are sintered into a tube. The tube is then collapsed into a rod, the preform, which is then drawn into the fiber.

The VAD process is described by T. Izawa and N. Inagaki in "Materials and Processes for Fiber Preform Fabrication - Vapor-Phase Axial Deposition" published in *Proceedings of the IEEE,* Vol. 68, No. 10, October 1980, pp. 1184-1186. Essentially, the VAD process provides continuous fabrication of the fiber preform in the axial direction on apparatus similar to a crystal pulling machine. Raw materials such as $SiCl_4$, $GeCl_4$, $POCl_3$ and $BBr_3$ are fed into oxy-hydrogen torches and fine glass particles produced by flame hydrolysis are deposited onto the end surface of a starting silica glass rod which acts as a seed. The result in a porous preform which is subsequently sintered into a transparency through zone melting using electric heating means.

A description of the MCVD process may be found in U.S. Pat. No. 4,217,027 issued to MacChesney and O'Connor and in an article by MacChesney entitled "Materials and Processes for Preform Fabrication - Modified Chemical Vapor Deposition and Plasma Chemical Vapor Deposition" published October 1980 in *Proceedings of the IEEE,* Vol. 68, No. 10, pp. 1181-1183. In the MCVD process $SiCl_4$ and oxygen reactants are introduced into the hollow interior of a high silica tube and reaction is induced therein to deposit numerous layers of high purity silica on the interior surface of the tube by heating the tube and its contents by means of a continuously traversing combustion gas burner. In this manner the thickness of the silica tube is increased to provide the cladding layer of the desired thickness in the drawn fiber. Next, in like manner, the vapor reactants for forming the fiber core, typically $POCl_3$, $SiCl_4$, $GeCl_4$, $BO_3$ and $O_2$, are introduced into the same hollow tube whereby particles of suitably doped silica are deposited and subsequently sintered into vitreous layers. Next the tube is collapsed by simply increasing its temperature while applying the pressure of the gas flames of the traversing burner. Finally, the resultant preform is then drawn into the fiber.

PCVD-plasma chemical vapor deposition uses either microwave plasmas to excite reactants and deposit vitreous particles directly on the inner surface of a high silica tube or duplex heating with an external torch and an internal r.f. plasma-generated fire ball on a high silica starting tube. The latter is regarded as a variety of the MCVD process with significantly higher throughput as compared to the conventional MCVD. The MCVD-r.f. plasma method is described by Fleming et al in U.S. Pat. No. 4,331,462 and by MacChesney in his article referred to above. The MCVD-r.f. plasma method requires the use of somewhat larger diameter substrate tubes in order to be carried out. In all the prior art deposition methods requiring a starting tube, the resultant preform length is identical to the length of the starting tube.

The MCVD processes described above are currently considered the state of the art. The limitations and costs associated with the MCVD processes are chiefly encountered in preform manufacture. While the use of larger preforms for drawing might be viewed as a potential economy, several limitations have thwarted attempts to manufacture larger preforms.

STARTING TUBE LENGTH: Increasing the length of the starting tube without simultaneously increasing the diameter, results in mechanical problems due to sagging of the tube as well as problems in supplying the gaseous feed to the deposition zone at its greatest distance from the point of entry. While additional tube supports could be provided at the cost of increased mechanical complexity, there is no solution to the latter problem.

TUBE WALL THICKNESS: Increasing the wall thickenss of the starting tube for the purpose of high-rate core deposition is not feasible for it would require a significant reduction in burner traverse speed and consequently a reduction in reactant flow and deposition rate. An increase of the wall thickness from one to three millimeters would require a reduction of the traverse speed of the burner by nearly 90 percent. See "Large Preforms Produced at High Rates by Particulate-Deposition Methods" by Andrejco et al.

TUBING DIAMETER: Increasing the tubing diameter, while maintaining a wall thickness from one to three millimeters initially, is a prerequisite for the r.f. plasma MCVD process. For the basic MCVD it results in increased energy consumption due to the increased heat losses without achieving high deposition rates or deposition efficiencies. Furthermore, the cost per weight of these tubes generally increases with their diameter.

ENTRY TAPER: In the MCVD processes as described above, the heat source or the substrate (for stationary heating elements) travels unidirectionally during the MCVD phase, while the reactant flows in counterdirection. At the end of each pass the reactant is turned off for a moment and the burner (or the tube) is returned to its starting position at a high speed whereupon the cycle is restarted. As a result of the constant parameters, such as the burner traverse speed and the reactant flow rate, an entry taper of the deposited layers evolves, owing to zero deposition at the restart. The length of this taper depends on many factors, such as the length of the heating zone, downstream cooling, diffusivity of the carrier gas(es) and the reactant flow rate, but not on the diameter of the tube.

Since the taper may be as long as 30 centimeters with typical starting tubes having a length of approximately 100 centimeters or 30 percent hereof, it severely limits the portion of the tube usable for producing a uniform fiber.

PREFORM DIAMETER: A typical single mode fiber has a diameter of about 110 micrometers and a core diameter of about 10 micrometers, with the clad/core ratio being 6/1. It is known that a maximum size reduction for the single step fiber drawing operation is approximately 200/1. It follows that the maximum diameter of a preform for producing a 100 micrometer fiber is about 20 millimeters. A typical preform diameter for the single mode fiber is 15 millimeters. With a 15 millimeter preform of 110 centimeters in length, a continuous fiber of 20.45 kilometers can be produced.

SUMMARY OF THE INVENTION

Accordingly, it is an object of the present invention to increase fiber forming productivity by providing a more efficient apparatus and process for producing the preforms from which energy transmitting fibers may be drawn.

Another object of the present invention is to realize an economy in the fiber production operation by production of a number of preforms from a single starter tube whereby the cost of the starter tube becomes a less significant factor in the unit cost of a preform.

Yet another object of the present invention is the reduction of entry taper losses, which range from 8 to 30 percent in the prior art, by employing a variable burner traverse speed at the restart as well as variable reactant flow rates.

Achievement of the foregoing objectives is provided by the present invention by provision of a novel preform production technique and a novel glass lathe. The novel glass lathe of the invention includes a lathe bed and a head stock and a tail stock, movable along the length of the bed with respect to the head stock, mounted thereon. Chucks are provided in the head stock and tail stock for rotatably holding the starter tube and the preform during building. A novel burner carriage arrangement is further incorporated into the glass lathe of the present invention and supports a vertically mounted burner associated with a quartz powder feeder which passes quartz powder through the burner flame onto the rotatably mounted glass tube or preform. The burner carriage is provided with a motor for movement back and forth along the length of the lathe bed. The burner carriage may also carry additional burners mounted in a facing relationship on either side of the rotating tube or, in the alternative, an r.f. coil. The burner carriage also supports a container for receiving quartz powder emanating from the vertical burner and bypassing the rotating tube and a coolant reservoir adapted to bring coolant into contact with the underside of the rotating tube.

According to the novel method of the present invention, layers of silica and doped silica are successively formed from vapor phase onto the interior of a starter $SiO_2$ tube mounted in the lathe, utilizing the burners arranged on opposing sides of the tube or the r.f. coil, using a modified chemical vapor deposition (MCVD) technique which includes introducing reactant vapors into the center of the rotating tube and traversing the length of the reactant loaded tube with a burner flame. During this MCVD procedure, an area of the tube following the burner flame is cooled by immersing the lower portion of the tube into the coolant contained in the reservoir. Since the carriage is traversing the length of the tube during this procedure, a travelling hot zone followed by a travelling zone is established within the tube. In accordance with the present invention, the MCVD procedure is followed by the deposition of succcessive layers of a quartz melt on the rotating exterior surface of the tube, derived from quartz powder fed through the flame of the vertical burner. After building the wall thickness up to at least twice the thickness of the starter tube, the tube is drawn down on the lathe by movement of the tail stock away from the head stock, to a diameter suitable for fiber drawing.

BRIEF DESCRIPTION OF THE DRAWINGS

In the Drawings:

FIG. 1 is a schematic illustration of a preferred embodiment of the apparatus of the present invention;

DETAILED DESCRIPTION

Figure 1A:
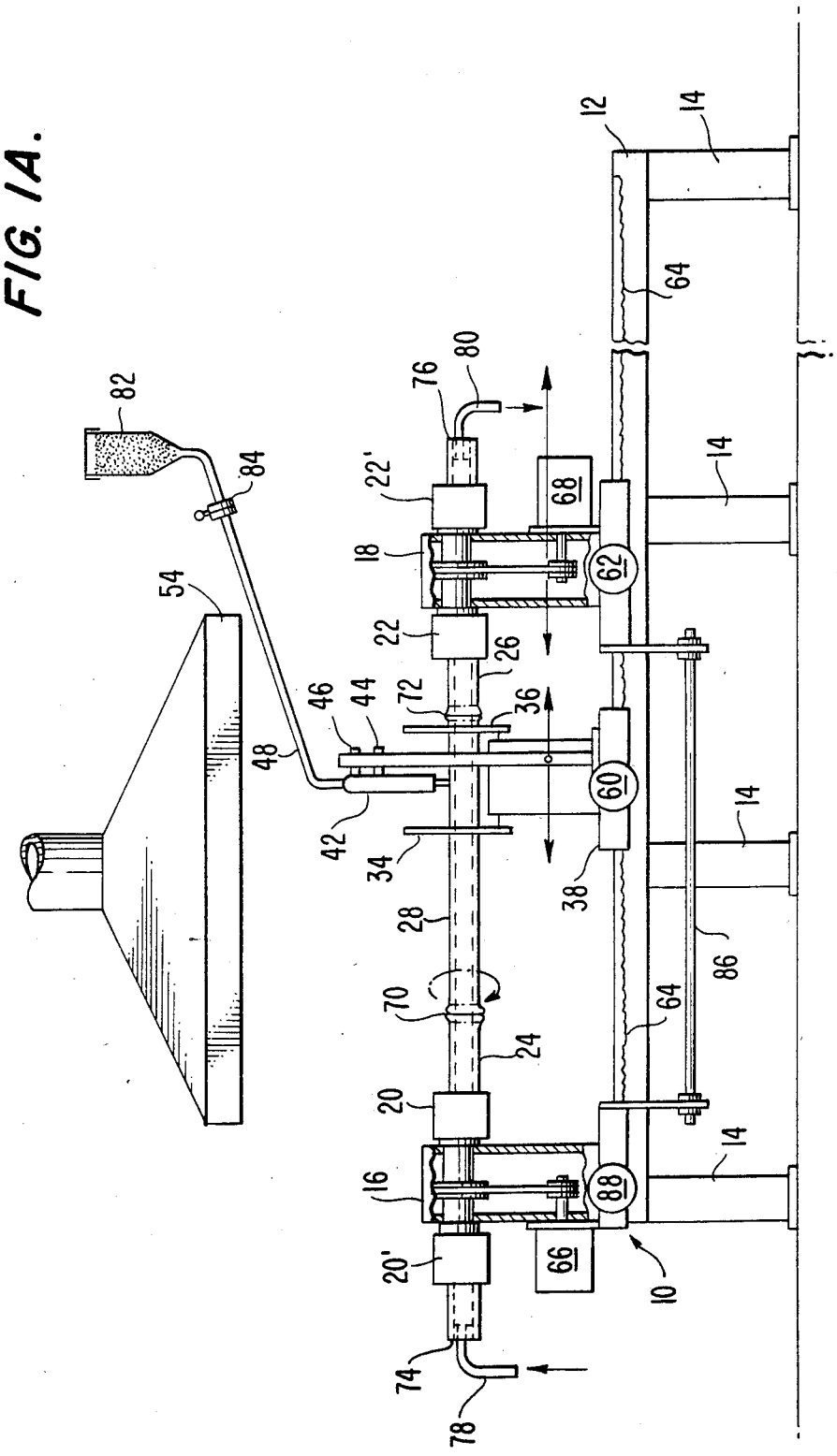
FIG. 1A is a partial schematic diagram illustrating a modification of the apparatus of FIG. 1 wherein both the head stock and the tail stock are movable.
Figure 2:
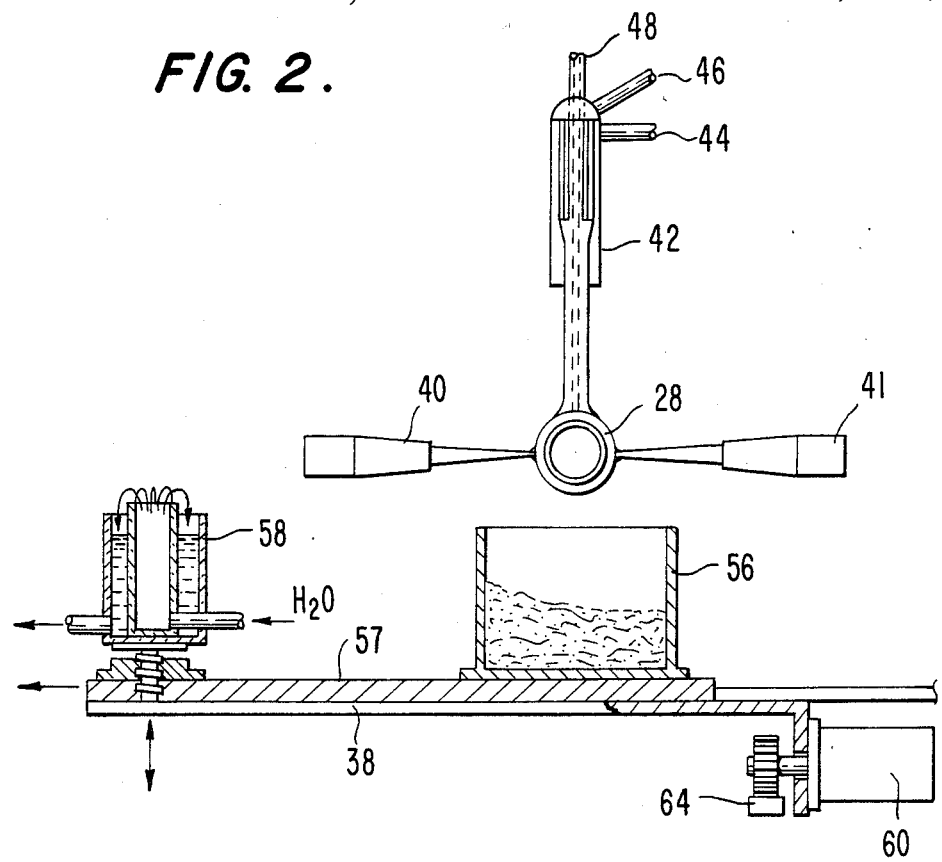
FIG. 2 is a schematic, enlarged representation of the lathe carriage shown in FIG. 1 and of the elements carried on the carriage.

A preferred embodiment of the novel glass working lathe of the present invention is depicted in FIG. 1. The lathe, generally designated by the reference numeral 10, is shown as including a bed 12 having a length which is some multiple of the desired preform length, support legs 14, a stationary head stock 16 and a movable tail stock 18. Head stock 16 and tail stock 18 are equipped with double chucks 20 and 22, respectively, in order to provide support for the starting tube holders 24 and 26, as well as the starting tube itself 28 (typically amorphous $SiO_2$). The chucks allow the use of starting tubes ranging from 5 to 100 millimeters OD, although this range should not be considered a process limitation. A burner carriage 38 is mounted on the lathe bed 12 and is equipped with two heating and sintering (MCVD)

burners 40 and 41 (see in FIG. 2), or optionally with an r.f. coil for the PCVD, and with a quartz powder melting burner 42. As shown in FIG. 2 burners 40 and 41 are aligned in a horizontal plane which passes approximately through the center of tube 28. The quartz melting burner 42 is provided with connections 44 for combustion gas, 46 for oxygen and 48 for receiving quartz powder for feeding to its flame. The quartz powder delivery system includes a reservoir or supply container 82, a valve 84 and the conduit 48 through which the solid quartz powder is fed to the burner 42. Two heat shields 30 and 32 are mounted on the burner carriage 38 and serve to contain the heating zone under the suction hood 54. Furthermore, the burner carriage 38 carries a container 56 to collect unfused quartz powder that does not adhere to the melting surface during the external deposition phase, and a cooler apparatus 58 (FIG. 2) to provide positive cooling of the downstream end of the substrate tube during the MCVD phase of operation. The burner carriage 38 is equipped with a bi-direction stepping motor 60 which, in turn, is operated by a translator and microcomputer not shown here.

Figure 3:
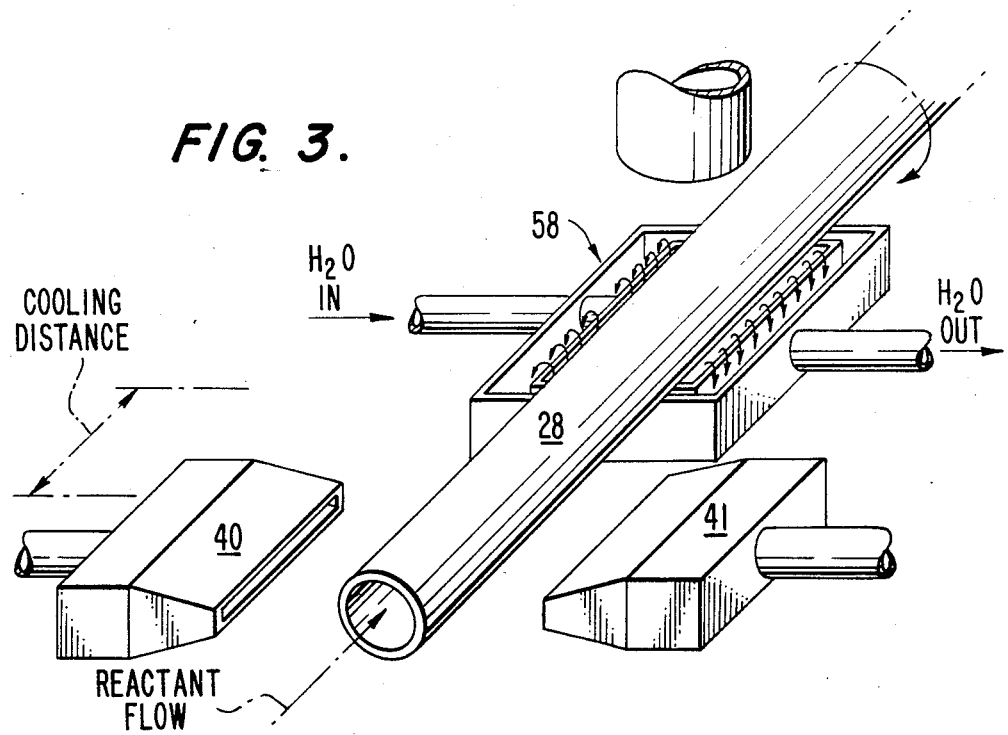
FIG. 3 is a schematic representation of the burners and cooler carried by the lathe carriage, showing their position relative to the rotating tube or preform.

As seen in FIG. 3 the cooler 58 is offset laterally with respect to burners 40 and 41, as is burner 42. During the MCVD procedure, the cooler 58 is positioned vertically beneath the (inactive) burner 42 with a pumped fountain, established therein, in contact with the underside of the tube 28. As further seen in FIG. 2, the cooler 58 and the container 56 are mounted on a slidable plate 57 which, in turn, is mounted on carriage 38 for linear reciprocating movement perpendicular to the path of travel of carriage 38. Upon switchover to the external quartz deposition phase of operation, slide 57 is moved (manually, or, optionally, by power means not shown) to position the container 56 vertically beneath the burner 42.

The movable tailstock 18 is operated by a similar stepping motor 62, translator arrangement. Burner carriage 38 and tail stock 18 can be precisely positioned on the lathe bed 12 utilizing pinions on the shafts of stepping motors 60 and 62, respectively, engaged in a gear rack 64 mounted along the lathe bed 12. Additional stepping motors 66 and 68 are provided for the head and tail stocks to synchronously rotate the chucks 20 and 22, respectively. The speed of rotation can be varied between zero to 200 RPM.

Figure 4:
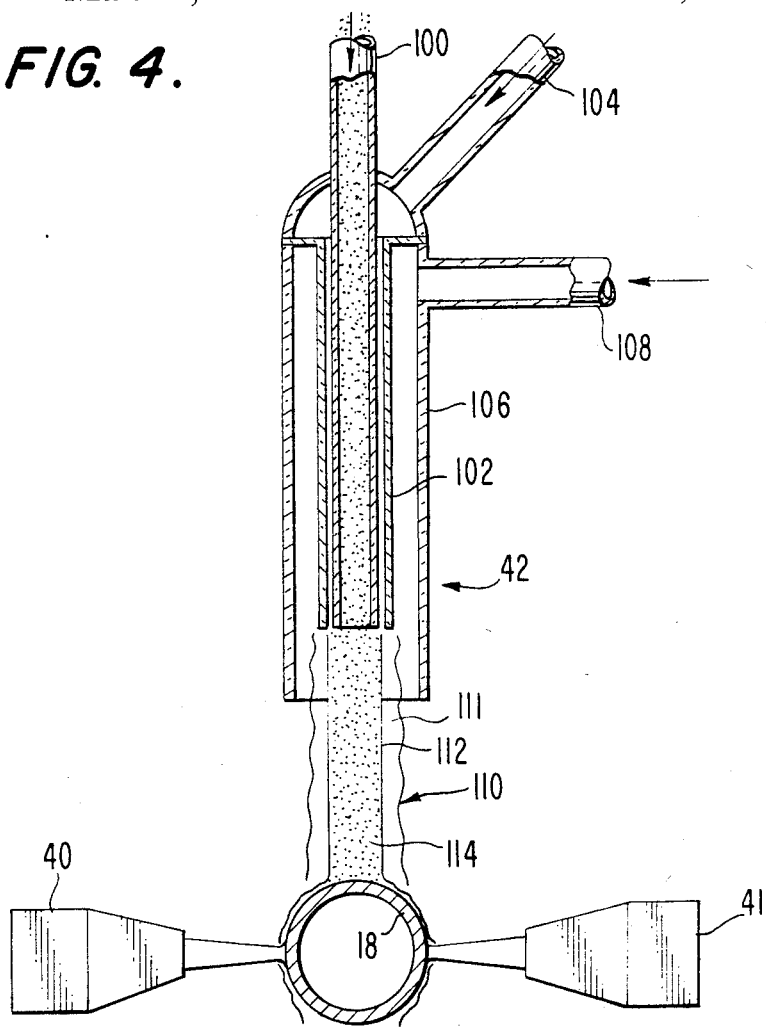
FIG. 4 is an elevational view, in cross-section, of the burner shown in FIG. 1.

As seen in FIG. 4, the quartz burner 42 consists of a central tube 100 for passage of quartz power from reservoir 82 into the burner flame 110, an intermediate jacket 102 defining a flow path (annular in cross-section) surrounding tube 100 for passage of oxygen received through inlet 104. Likewise, an outer jacket 106 defines an annular passageway surrounding jacket 102 for hydrogen gas received through inlet 108. The hydrogen and oxygen form a diffusion flame 112 surrounding the partially melted quartz powder 114. Thus, flame 110 consists of a hydrogen/oxygen diffusion flame 112 surrounded by a secondary diffusion flame 111 formed by the burning hydrogen and air. The tube 100 and jackets 102 and 106 are preferably formed of fused quartz to avoid the need for cooling and the possibility of product contamination. However, with provision of a cooling jacket, a metal burner could be used.

Operation of lathe 10 will now be described in conjunction with the drawings. The operation described below will typically use a state of the art quartz starter tube, measuring 27 millimeters outer diameter, 25 millimeters inner diameter and 1100 millimeters in length.

To initiate the process, first a holder 24, typically likewise a quartz tube, is inserted into the chucks 20, 20' of the head stock 16 and secured, while the starting tube is temporarily placed in the chucks 22, 22' of the tail stock 18 and secured. Next rotation of the head stock motor 66 and tail stock motor 68 is initiated (at least 100 RPM) and the MCVD burners 40 and 41 (each about 4 inches in width) are ignited, while the starting tube 28 is closely positioned against the holder 24. After both the starting tube 28 and the holder 24 have been heated to facilitate welding, the starting tube 28 is moved against the holder 24 thus forming a gastight weld 70. Next the MCVD burners 40 and 41 are turned off and sufficient time is permitted to allow the weld 70 to solidify. Then the starting tube 28 is released from the trail stock chucks 22, 22' and another holder 26 is mounted there. The above welding procedure is repeated to form a second gastight weld 72 between the starting tube 28 and the tail stock holder 26.

THE MCVD PROCEDURE

With the starting tube now in place, rotary seals 74 and 76 are inserted on the outboard ends of holders 24 and 26, respectively. The head stock seal will be connected with the reactant gas delivery system (not shown here) through tube 78, while the tail stock holder will be connected through tube 80 to an exhaust system with a scrubber (not shown here) for the removal of undeposited particles and unused gases of the MCVD.

Next, the MCVD process is initiated by starting the chuck rotation motors 66 and 68, with the heating and sintering burners 40 and 41 stationary at one (starting) end of the substrate tube. After a short warm-up period, the gaseous reactant delivery system is activated to provide a silica forming vapor, e.g., $SiCl_4$ and $O_2$, which, within the heated area of the tube, will react to deposit pure silica on the inner surface of the substrate tube. Deposition of ultra-high purity silica in this manner is necessary to provide the necessary reflectivity in the cladding layer. Burner carriage motor 60 is then started and its traverse speed is slowly increased from zero to approximately 18 centimeters per minute over a predetermined period of time or over a predetermined distance, equal to the entry taper that would form based on the length of deposition, while maintaining constant vapor reactant flow. Since the rate of deposition is inversely proportional to the traverse speed, the formation of the entry taper is eliminated and a more uniform preform is created. This improves the yield based on the starting tube, a considerable improvement over the yields of the prior art. Using the conventional prior art MCVD, optimum conditions for deposition, approximately one gram per minute of deposition can be obtained, resulting in an average deposition layer of 30 micrometers of vitreous material per pass. After the burner has reached one end of the starting tube 28, the reactant is quickly shut off and the burner carriage direction is reversed and increased (retrieval phase). Upon returning to the starting end, the MCVD procedure is restarted and repeated until a sufficiently thick layer has been added to the starting tube to provide the required ultra-high purity cladding. Depending on the quality of the starting tube at least 15 to 20 passes of pure $SiO_2$ are generally required for high quality fibers. This may add up to 60 percent to the wall thickness of the starting tube.

While the MCVD burners 40 and 41 are traversing the length of tube 28 during internal silica deposition from the vapor phase, tube 28 is simultaneously being cooled by contact with a fountain of water emanating from the top of cooling device 58. Cooling device 58, like burners 40, 41 and 42, is mounted on carriage 38 and traverses the tube 28 simultaneously therewith. Cooling device 58 is positioned immediately downstream of burners 40 and 41 and, as best seen in FIG. 3, resembles an elongated trough, approximately 4–5 inches in length. A screw jack 98 (FIG. 2) serves to hold the cooling device 58 on carriage 38 and allows the vertical position of cooling device 58 to be adjusted at will. By immersing the bottom of tube 28 in the fountain of water emanating from cooler 58 more efficient cooling is obtained than with prior art devices. With a falling curtain of water as per the prior art, that curtain tends to be separated from the hot tube by a water vapor zone, the water vapor acting as an insulating barrier. That problem is significantly reduced by the present invention.

Next, the vapor reactant supply is switched to a core material precursor, e.g. oxygen, $SiCl_4$, $GeCl_4$ $POCl_3$ and $BBr_3$, and the vapor flow rate reduced for the deposition of the core material. The core deposition proceeds slower than the deposition of the high purity silica, at approximately half the rate. However, in order to overcome the entry taper problem, the core deposition is carried out in the manner as described above, namely, by varying the burner traverse speed initially from zero at the starting end to a constant value during the MCVD phase. As with the deposition of silica from vapor phase, the deposition of core material from vapor phase is accompanied by use of the cooler 58 to maintain a temperature differential suitable for MCVD.

Figure 5:
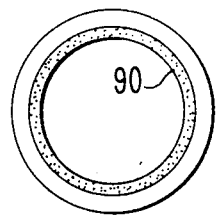
FIG. 5 is a cross-sectional view of a prior art preform.
Figure 6:
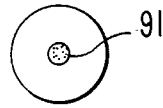
FIG. 6 is a cross-sectional view of a rod formed by collapsing the tube of FIG. 5.
Figure 7:
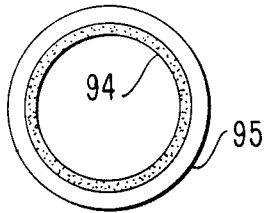
FIG. 7 is a cross-sectional view of a preform partially completed in accordance with the present invention, i.e., at the completion of the MCVD operational phase.
Figure 8:
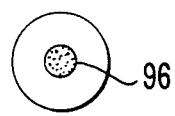
FIG. 8 is a cross-sectional view of a rod formed by collapsing the partially completed preform of FIG. 7.

In another deviation from the prior art MCVD process techniques, the core material is deposited in considerable larger amounts than is required for the desired clad/core ratio (at least 2 times greater). For example, in the above example if a total of 600 microns of high purity silica had been added to the starting tube wall thickness (1 mm), as is conventional, only approximately 46 microns of core layer (90 in FIG. 5) would be needed for the complete preform to be drawn into a fiber. Upon collapse of such a prior art preform, a rod of 12.52 millimeters diameter with a core of 2.09 millimeters would be obtained (91 in FIG. 6). However in the present invention, the process of core deposition is continued until the total core layer (94 in FIG. 7) becomes, for example, 0.4278 millimeters which corresponds to a core diameter of (after collapsing), for example, 6.27 millimeters (96 in FIG. 8) or nine times the amount accumulated in the prior art MCVD process. As can be seen, slightly over 2 millimeters in wall thickness can be achieved for the complete chemical deposition of the present invention while avoiding the problems associated with heavy wall deposition encountered by the prior art, e.g., reduced throughput.

Next, the tube may optionally be heated and collapsed into a rod. The tube may be collapsed, using the prior art technique, by slowing down the burner traverse speed which increases the temperature and allowing the pressure of the flames to do the work; however, it is preferred to maintain the higher traverse speed while applying a vacuum to the inner space of the tube to accomplish the same for increased preform throughput. More preferably, the external quartz deposition is onto the uncollapsed tube as depicted in FIG. 1.

The tube 28, after internal deposition, is an intermediate preform having a clad/core ratio of 2.36. For the single mode fiber, that ratio must be increased to 6/1, requiring external deposition of material.

THE QUARTZ DEPOSITION PROCEDURE

With the uncollapsed preform 28 still mounted on the lathe 10, the MCVD burners 40 and 41 are shut off and the container 56 is shifted into position displacing water cooling well 58 (FIG. 2). Next the quartz melting burner 42 is ignited and, upon the intermediate preform reaching a temperature of at least 2000° C., the quartz powder delivery system is activated.

Quartz powder, preferably having a grain size range of minus 300 microns plus 50 microns, is now fed into the flame of the quartz melting burner 42. The feeding of the powder may be simply by gravity or pneumatically, using a carrier gas. Gravity feed is preferred since the carrier gas tends to reduce the thermal efficiency of the flame. Upon entering the flame, the quartz powder feed quickly heats and begins to melt, beginning at the surface of the individual grain. Upon reaching the surface of the intermediate preform, the grains will stick and melt to form a vitreous layer without the necessity for additional vitrification passes. In other words, deposition and vitrification occur simultaneously. A small amount of grains is repelled from the melting surface by a masking process due to a desirable high feed rate, and is collected in the container 56 for future re-use. The efficiency of the powder deposition of the present invention is better than 90 percent at deposition rates of up to 7 pounds per hour. While depositing, the burner traverses along the axis of the intermediate preform in both directions and without any interruption of the feeding system as required during the MCVD retrieval phase. Without much effect upon the rate of deposition, the traversing speed of the burner may be varied over a wide range of speeds in order to provide a selected, desirable layer thickness for each pass.

Figure 9:
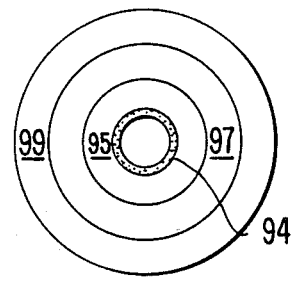
FIG. 9 is a cross-sectional view of a preform completed in accordance with the present invention.

In order to provide the required clad/core ratio (6:1) for the intermediate preform, its outer diameter needs to be increased to six times the core diameter, namely, to 37.62 millimeters. Thus, a total of 11.4 millimeters of additional wall thickness must be accumulated. At the lowest practical traverse speed of the quartz melting burner 42, a layer having a thickness of 6 millimeters can be deposited per pass. Only two passes are required to complete yet another intermediate preform as shown in FIG. 9, having core-forming layer 94, starter tube 95 and externally formed quartz layers 97 and 99.

Upon reaching the final diameter, the powder feed is shut off and the burners 40 and 41 are activated, now serving as heating elements only, and are positioned at the start of the preform, most distant from the head stock of the lathe. The temperature of the preform is raised to over 2000° C. by adjusting the burner traverse speed to 15 millimeters per minute while the burner carriage 38 is moving from the weld 72 adjacent the tail stock 18 toward the head stock 16, while the tail stock 18 is being pulled away by motor 62 at a speed eight times that of the burner carriage 38, namely, 120 millimeters per minute.

Using the extra length of the lathe, e.g., nine times the length of starting tube, specifically provided for this pulling operation, the enlarged preform is drawn down to a diameter, preferred for fiber drawing, e.g., 12.54 millimeters (in the present example), the identical diameter which would have been reached by the prior art MCVD process. In general, the preform should be drawn down to 20 mm or less, i.e. a diameter suitable for fiber drawing.

The tube may now be cut into conventional lengths thus furnishing, for example, 9 preforms for drawing into fibers. These preforms are collapsed during fiber drawing or, optionally, may be rods formed by collapsing on the lathe after the MCVD steps or during or after external quartz deposition.

The present invention is capable of producing 9 typical preforms equal to those of the prior art, using only one starting tube while adding only approximately two hours or less to the entire processing time of the prior art MCVD process. The present invention offers the further advantage of reducing material losses which occur when the preform is separated from its holders.

The invention is not limited to the manufacture of intermediate preforms comprising diameters three times that of a desirable preform for fiber drawing. Using lathe 10, quartz material can be accumulated on intermediate preforms for enlarging same up to 200 millimeters in diameter, this still not being the limiting diameter. By replacing the combustion heating element with a more powerful electrically heated horizontal furnace, up to 177 typical preforms can be drawn from such an intermediate ingot, again using only one typical starting tube.

The lathe can also utilize the PCVD r.f. type method, by mounting the r.f. coil on the burner carriage along with the necessary combustion gas burner and the downstream water cooling well. The process of the present invention can be performed with a movable r.f. coil and burner system, as used in the conventional MCVD. In another viable alternative depicted in FIG. 1A, the starting tube may be moved relative to a stationary burner carriage. This requires that the previous stationary head stock now becomes movable by coupling it together with the tail stock through the coupling rod 86 and provision of a stepping motor 88 and movable carriage for head stock 16 for synchronous operation with the stepping motor 62 of the tail stock 18 while the burner carriage 56 remains locked in a stationary position during operation.

Practice of the method of the present invention is not limited to use of the novel lathe in whole or in part. For example, the intermediate preform may be formed on any conventional glass lathe or on the novel lathe herein disclosed and then transferred to a drawing apparatus for drawing down to a size approximating that of the starter tube. Suitable drawing apparatuses include horizontal drawing lathes with electric or gas heaters and vertical drawing apparatus with electric or gas heaters. Optionally, though less preferred, an extrusion die may be used in combination with the drawing apparatus to control the outer diameter.

The invention may be embodied in yet other additional specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A glass lathe for producing a fused quartz preform capable of being drawn into an energy transmitting fiber, said lathe comprising:
   a lathe bed and a tail stock and a head stock mounted on said bed and means for moving said tail stock along the length of said bed;
   chuck means associated with said head stock and said tail stock for mounting a starter tube and the fused quartz preform formed therefrom and means for rotating the tube or preform while mounted in said chuck;
   a carriage slidably mounted on said lathe bed and means for driving said carriage back and forth along the length of said lathe bed;
   means for introducing gases into the lumen of the rotating tube mounted on said lathe;
   burner means mounted on said carriage for heating the tube or preform to decompose said introduced gases, said burner means comprising a burner mounted vertically above said rotating tube or preform;
   a reservoir for a coolant mounted on said carriage and means for establishing a fountain in said reservoir to immerse a section of the lower portion of the rotating tube or preform in the coolant when said vertically mounted burner is not operating on said tube or preform; and
   means for feeding solid quartz particles downwardly through the flame of said vertically mounted burner onto said rotating tube or preform.

2. The lathe of claim 1 further comprising:
   a container mounted on said carriage and means on said carriage for selectively (1) positioning said container vertically beneath said vertical burner and said tube or (2) positioning said coolant reservoir for contacting said tube or said preform with the coolant contained therein.

3. The apparatus of claim 2 wherein said positioning means is a slide member mounted on said carriage and supporting said container and said coolant reservoir, said slide member being movable back and forth across said carriage along a path approximately perpendicular to said lathe bed.

4. The apparatus of claim 1 wherein said burner means further comprises burners mounted in a facing relationship on either side of the rotating tube and horizontally spaced from said reservoir to allow for cooling prior to contact to said coolant.

5. The apparatus of claim 1 wherein said vertically mounted burner is an oxygen/hydrog burner comprising a central tube for passage of the particulate quartz therethrough, an intermediate jacket defining an annular flow space for oxygen feed around said central tube and an outer jacket defining a second annular flow passage, surrounding said intermediate jacket for passage of hydrogen gas.

6. The apparatus of claim 5 wherein said central tube, intermediate jacket and outer jacket of said vertical burner are fabricated of fused quartz.

* * * * *